June 9, 1942. W. E. CAMPBELL 2,285,897
ACUTE ANGLE GAUGE FOR SAW TABLES
Filed March 31, 1938 2 Sheets-Sheet 1
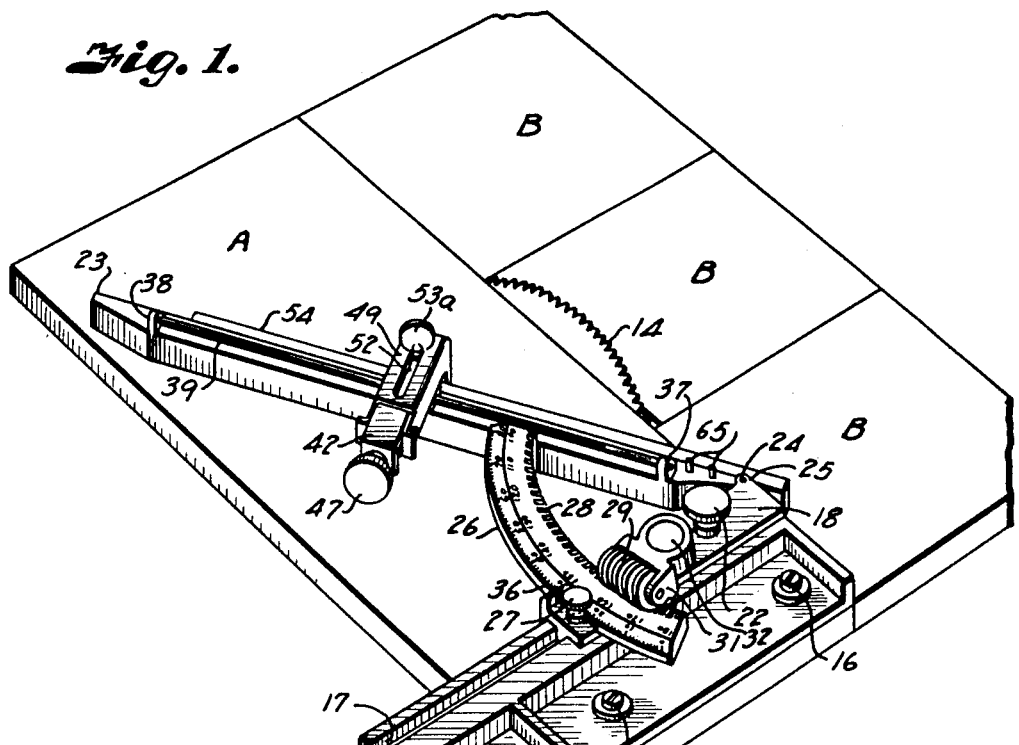
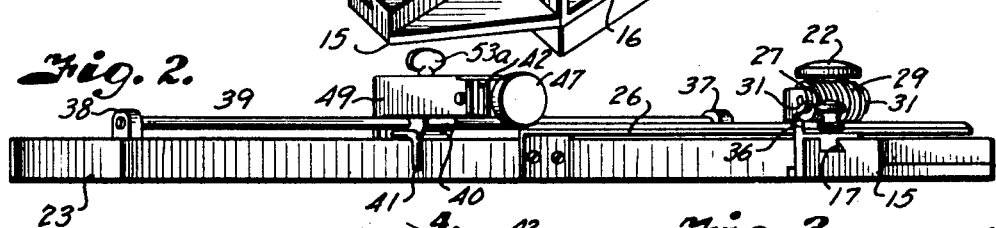
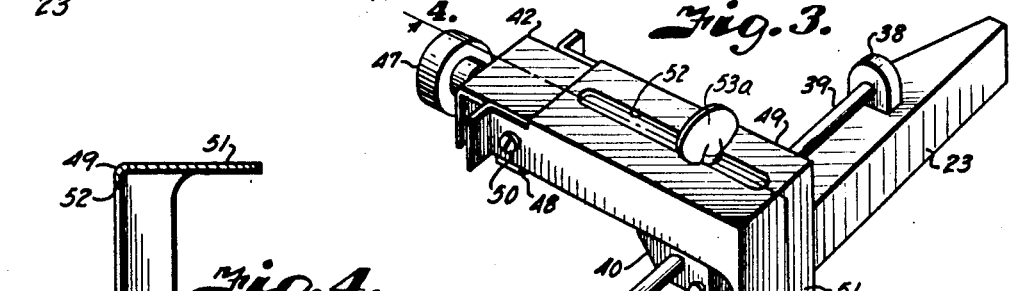
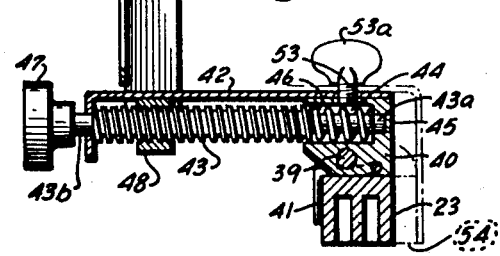
INVENTOR
Walter E. Campbell
BY
ATTORNEY June 9, 1942. W. E. CAMPBELL 2,285,897
ACUTE ANGLE GAUGE FOR SAW TABLES
Filed March 31, 1938 2 Sheets-Sheet 2
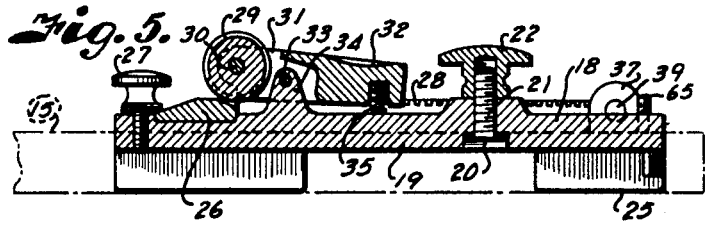
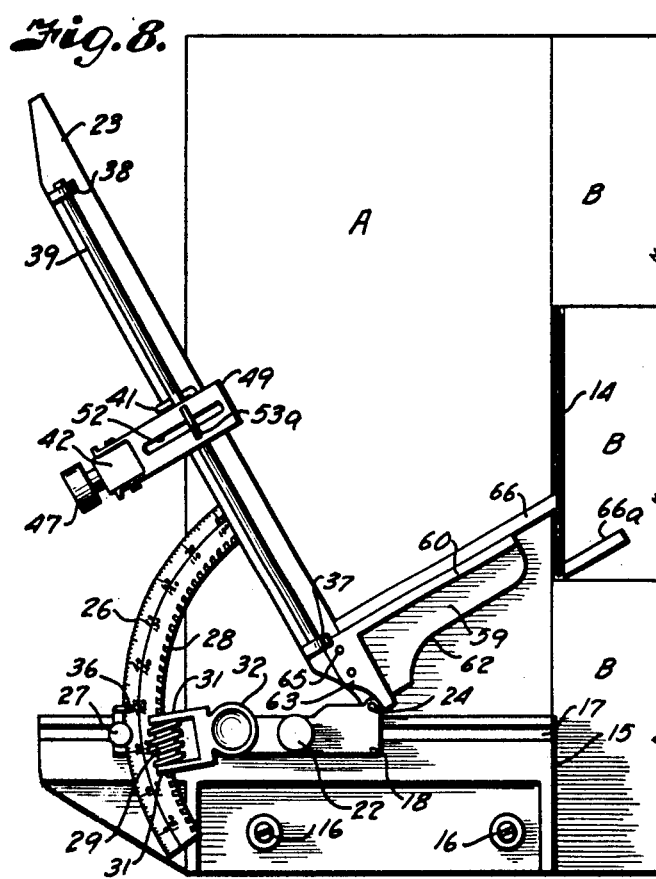
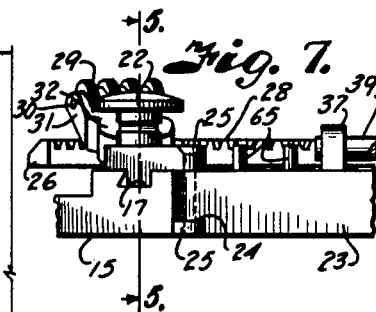
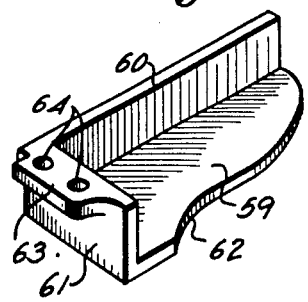
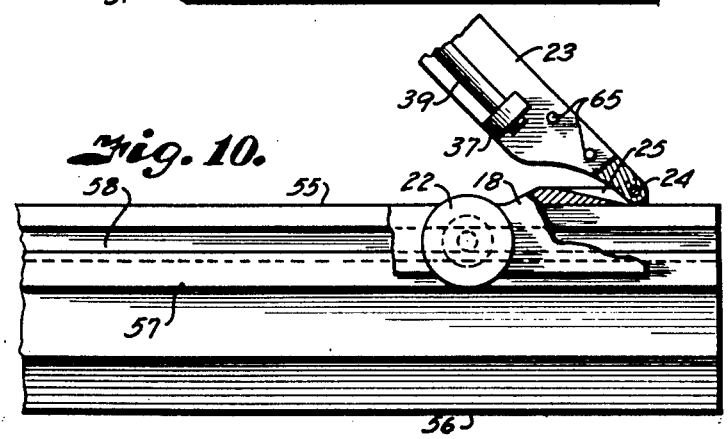
INVENTOR
Walter E. Campbell.
BY
ATTORNEY

UNITED STATES PATENT OFFICE 2,285,897

ACUTE ANGLE GAUGE FOR SAW TABLES

Walter E. Campbell, Wichita, Kans.

Application March 31, 1938, Serial No. 199,160

13 Claims. (Cl. 29—69)

My invention relates to an improvement in acute angle gauges for saw tables, and refers more particularly to the type used on saw tables such as are employed in printing shops where filler bars are employed, and these bars must be cut to some particular predetermined angle such that when the type is clamped in a frame, a particular portion of the type will be held at an angle to conform to that cut on the filler bar. Type set at such an angle is frequently found in newspaper advertising where it is desired to emphasize some certain advertisement, or portion of the advertisement, by setting the advertisement at some angle differing from the remainder of the page.

Frequently artists will design an advertisement in which some portion of the ad is set at an angle which is specified by the artist. Therefore the filler bars must be cut to that angle in setting up the type for the ad. Previous to this time that has been a difficult thing to do because there has been no satisfactory way to determine the angle of the cut that the saw table would make.

It is also common practice for an artist to produce an advertising layout having parts therein that are set at some arbitrary angle, but the degree of the angle is not specified. Therefore the man setting up the type for the ad must in some way be able to find the correct angle so as to cut that angle on the filler bars and reproduce the copy furnished by the artist.

Frequently in setting up type that is set at an angle the type may be outlined by border lines. Therefore it is necessary to cut the border type at the proper angle at the ends so that the border on adjacent sides will properly meet to form a uniform juncture of the border at the corner.

In view of all of these troubles I have developed my improved acute angle gauge which by the use thereof will overcome all of these troubles. While this gauge is designed principally for use on saw tables in print shops it is obvious that the device may also be used on saw tables for woodcutting such as are used in planing mills, cabinet shops and the like to good advantage.

In accomplishing these and other objects of the present invention, I have provided improved details of structure, the preferred form of which is illustrated in the accompanying drawings, wherein:

Fig. 1 is a perspective view of a saw table showing my improved gauge applied thereto.

Fig. 2 is a side elevational view of the gauge illustrated in Fig. 1.

Fig. 3 is a detail perspective view of the clamp and bar structure of the gauge, one end of the bar being shown in section.

Fig. 4 is a detail vertical cross-section through the clamp and bar structure substantially on the line 4—4, Fig. 3, showing the clamp in raised position in full lines and in lowered position in dotted lines.

Fig. 5 is a detail vertical cross-section through a slide element, showing its relation to a protractor, and taken along the line 5—5, Fig. 7.

Fig. 6 is a detail perspective view of a portion of the clamping element shown in Fig. 5.

Fig. 7 is a fragmentary side elevational view, from the right relative to Fig. 1 showing the juncture of mitre blade, gauge and slide element.

Fig. 8 is a plan view of the apparatus shown in Fig. 1 with an angle attachment applied and showing the manner of cutting a bar when one of the table elements is moved relative to the other.

Fig. 9 is a detail perspective view of the angle attachment shown in Fig. 1.

Fig. 10 is a plan view of a straight edge with the mitre blade attached thereto.

Fig. 11 is an end elevational view of the straight edge shown in Fig. 10.

Referring more in detail to the drawings:

A and B, Fig. 1, designate a saw table top which comprises the two parts A and B, and between which is mounted a circle saw 14, the part B being stationary and the part A being slidable back and forth in parallelism with the circle saw 14. The portion A is provided with a gauge element 15 that is rigidly attached to the portion A of the saw table by means of bolts 16 at an angle of ninety degrees to the saw 14. The gauge element 15 is provided with a dove-tail groove 17, the object of which will be later explained. The acute angle gauge device comprises a slide element 18 having a depending rib or tongue 19 Fig. 5, which is adapted to be received in and slide in the dovetail groove 17. At 20 is a dovetail clamp element slidably inset in the tongue 19 and is provided with an upwardly extending stud 21 which passes upwardly through a hole in the body portion of the slide element 18. At 22 is a thumb nut that is threaded on the stud 21 so that by screwing the thumb nut 22 on the stud 21 the block 20 will bind in the dovetail groove 17 to rigidly bind the slide element 18 on the element 15. At 23 is shown a miter blade, one end of which is pivotally mounted at 24 between ear like elements 25, Figs. 1 and 10, that are integrally formed on the slide element 18. Rigidly attached to the miter blade 23 is one end of a protractor segment 26, the other end of the protractor 26 passing over one end of the slide element 18. At 27 is a thumb nut which is threaded into the slide element 18, Fig. 5, and overlaps the edge of the protractor element 26 so that by screwing the thumb nut 27 downwardly it will bind on the edge of the protractor 26 so as to hold the miter blade 23 in any fixed position. The protractor segment is provided with teeth 28 between which is positioned the turns of a threaded cylinder 29 which is revolvably mounted at 30 between the legs 31 of a cantilever thumb piece 32 that is pivotally mounted at 33 on a support 34 that is integrally formed on the slide element 18. At 35 is a spring, seated in the body of the thumb piece 32 and bearing against the face of the slide element 18 so as to rock the thumb piece 32 upwardly and hold the threads of the cylinder 29 between the teeth 28 on the protractor element so that by revolving the cylinder 29 the protractor will be moved to rock the miter blade 23 to any desired angle, which will be registered by the pointer 36 that is carried on the slide element 18 and points to the degree readings on the protractor.

On the miter blade 23 is a pair of upwardly extending ear like elements 37 and 38 on either end thereof, and in which is rigidly mounted a shaft 39 on which is slidably mounted a clamp element which comprises a slide block 40, Figs. 3 and 4, which rests on top of the miter blade 23 and is adapted to slide thereon. The block 40 is provided with a hole through which the shaft 39 slidably passes. At 41 is a hook like element which is pivotally mounted in the block 40 and passes between the shaft 39 and the miter blade 23 and turns downwardly so as to bear against the back side of the miter blade 23. At 42 is an L-shaped element, one end of which is rigidly attached by any suitable method, such as screws or spot welding, to the upper face of the block 40. At 43 is a threaded shaft having a pin portion 43a formed on one end thereof and a bearing shaft portion 43b formed in the other end thereof. The block 40 is provided with a bore 44 which forms a housing in which is positioned one end of the threaded shaft 43 and through which extends the pin portion 43a of the shaft 43, which revolvably rests in a bearing 45 formed in the block 40. The shaft 43b is carried in a bearing formed in the vertical leg of the L-shaped element 42. In the bore 44 is a helical spring 46 that is positioned around the pin 45 and is under compression between the end of the threaded shaft 43 and the body portion of the block 40, so as to press the other end of the threaded shaft 43 against the vertical leg of the L-shaped element 42. At 47 is a handle element that is rigidly mounted on the shaft 43b by which the threaded shaft 43 may be turned. At 48 is a block element that is threaded on the shaft 43 and the upper face thereof fits against the horizontal leg of the L-shaped element 42 as the shaft 43 is rotated. At 49 is a channel like element that is pivotally mounted on screw elements 50 on the block 48 in such a manner that the web of the channel will lie on top of the horizontal leg of the L-shaped element 42 and the legs of the channel 49 will straddle and drop down over the sides of the L-shaped element 42, threaded shaft 43 and part of the block 40. The other end of the channel 49 is provided with an integrally formed lip element 51, which when the channel element 49 is placed in its down position, the lip element 51 will overlap, and reach approximately to the edge of the miter blade 23. The web of the channel 49 is provided with an elongated slot 52, the object of which will be later explained. At 53 is a wing screw, the stud of which is threaded into the block 40 in such a position that the wing portion 53a of the wing screw 53 may be turned to a position longitudinal with the L-shaped element 42, whereupon the channel element 49 may be rocked to its lowered position, whereupon the wing 53a and a portion of the stud 53 will pass through the slot 52 in the channel element 49 whereupon the wing 53a may be turned crossways as shown in Figs. 1, 2, 3 and 8 so that the wing 53a will overlap a portion of the web of the channel 49 to lock the channel 49 in its lowered position, whereupon the turning of the handle 47 will move the lip element 51 to bind or release a bar 54 against the miter blade 23 so as to rigidly hold the bar 54 during the operation of cutting by the saw 14. At 55 is shown an independent straightedge element having a beveled portion 56, and an upwardly extending portion 57 in which is a dovetail groove 58 which is a duplicate of the groove 17 in the gauge element 15. The object of the straightedge 55 is that the slide element 18 may be removed from the guide element 15 and placed on the straightedge element 55, whereupon the device may be used as an angle finding instrument when it is desired to cut filler bars to an angle which the artist has drawn but has not specified; i. e., the straightedge and gauge may be placed independently on an artist's layout to determine relative angles of parts thereof. If it is desired to cut bars so that their corners will fit properly together when the bars are placed at an angle of ninety degrees apart, such a cut may be made by the use of the right angle gauge 59 which is shown in Figs. 8 and 9. This element comprises a casting having two legs 60 and 61 that are positioned ninety degrees apart by means of a web 62 integrally formed therebetween. The leg 61 is provided with an outwardly extending lip 63 which is provided with a pair of holes 64, so positioned that the leg 61 may be placed against the face of the miter blade 23 and pins 65 rigidly positioned on the miter blade 23 will enter the holes 63, and rigidly hold the element 59 so that the leg 60 will stand at an angle of ninety degrees to the miter blade 23 so that a bar 66 may be placed against the leg 60 and the portion A of the table top may be moved so that the bar 66 will engage the saw 14 to cut off the piece 66a and leave the desired angle on the end of the piece 66.

The operation of the device is as follows: If the artist has specified the degree of angle to which the type is to be set, the thumb nut 27 may be loosened and the thumb piece 32 pressed downwardly whereupon the threads on the cylinder 29 are removed from the teeth 28 on the protractor 26, whereupon the miter blade 23 may readily be rocked to approximately the right angle, whereupon the thumb piece 32 may be released and the threads on the cylinder 29 will enter between the teeth 28 and then by revolving the cylinder 29 with the fingers the protractor segment 26 will move the miter blade 23 to exactly the right angle as will be pointed out by the pointer 36 on the degree marks on the protractor element 26, whereupon the thumb nut 27 may be tightened to rigidly hold the miter blade 23 at its proper angle. The thumb nut 22 may then be loosened and the slide element 18 may be slid along the guide 15 to its desired position similar to that shown in Fig. 1, whereupon the bar 54 to be cut is placed against the miter blade 23, and the lip element 51 on the clamp device is rocked over the bar 54 and the handle 47 turned so as to pull the block 48 and channel 49 rearwardly to bind the bar 54 rigidly against the miter blade 23 to prevent any slippage of the bar 54 during the process of cutting.

In binding the bar 54 against the miter blade 23 it is obvious that the pull on the channel 49 would have a tendency to move the block 40 toward the lip 51. This movement is prevented by the hook element 41 as will be readily understood. In this binding action the spring 46, being a comparatively stiff spring will function to ordinarily produce enough binding pressure on the bar 54 to hold it during the process of cutting. After the cut has been made the bar may be quickly released by pressing on the handle 47 so as to compress the spring 46 and move the clamp leg 51 from the bar 54, so that the bar 54 may be easily and quickly removed. This operation is much quicker than turning the handle 47 so as to revolve the threaded shaft 43 to release the clamp.

Now if the artist has not specified the degree of angle at which the type is to be set and has merely furnished a drawing or copy, the acute angle gauge may be employed to find the angle as follows. The screw 22 is loosened whereupon the slide 18 and attached parts may be slipped from the element 15 and remounted on a straightedge element 55 so that the tongue or rib element 19 as well as the binding block 20 will be positioned in the groove 58, whereupon the thumb nut 22 may be tightened so as to rigidly bind the element 18 on the straightedge 55. This having been done, the device may then be laid on the copy so that the straightedge 56 will lie on the straight or horizontal lines of the copy, whereupon the arm 23 may be swung to coincide with the angle on the copy, at which point the thumb nut 27 may be tightened so as to rigidly bind and hold the miter blade 23 in its adjusted position. This having been done, the thumb nut 22 may now be loosened and the element 18 and attached parts may be removed from the straightedge 55 and be replaced on the element 15 on the movable plate A of the saw table, whereupon the bar 54 may be clamped to the miter blade 23, as and for the purposes previously described.

It is preferable for the clamp holding the bar 54 to engage the bar 54 somewhere along its central portion, therefore the clamp element may be slipped up and down the miter blade 23 on the shaft 39 to any desired position after which the clamp may be employed to clamp the bar 54 to the miter blade 23 the same as previously described.

Such modifications of my invention may be employed as lie within the scope of the appended claims. Now having fully described my invention, what I claim is:

1. An angle determining attachment for a cutting machine having a work conveyor movable past a cutter, said attachment comprising, a support detachably associated with the work conveyor, means for clamping said support to the conveyor at various selected distances from the plane of cutting, an arm swingable relative to said support and plane about an axis located near said plane, a segment gauge carried by said arm, means coacting with said gauge and with said support for locking said arm in various positions of adjustment, and means carried by said arm for clamping the work thereto.

2. An angle determining attachment for a cutting machine having a work conveying gauge bar movable past a cutter, said attachment comprising, a support detachably associated with the work conveying bar, means for clamping said support to the work conveying bar at various selected distances from the plane of cutting, an arm swingable relative to said support and plane about an axis located near said plane, a segment gauge carried by said arm, and means coacting with said gauge and with said support for locking said arm in various positions of adjustment.

3. An angle determining attachment for a cutting machine having a work conveyor movable past a cutter, said attachment comprising, a support detachably attachable to the work conveyor at various selected distances from the plane of cutting, an arm swingable upon said support and relative to said plane about an axis located near the plane of cutting, and means carried by said arm for clamping the work thereto.

4. An angle determining attachment for a cutting machine having a work conveyor movable past a cutter, said attachment comprising, a support detachably associated with the work conveyor, means for clamping said support to the conveyor at various selected distances from the plane of cutting, an arm swingable relative to said support and plane about an axis located near said plane, a segment gauge carried by said arm, and means coacting with said gauge and with said support for locking said arm in various positions of adjustment.

5. An angle determining attachment for a cutting machine having a work conveying gauge bar movable past a cutter, said attachment comprising, a support detachably attachable to the work conveying gauge bar at various selected distances from the plane of cutting, an arm swingable upon said support and relative to said plane about an axis located near the plane of cutting, and means carried by said arm for clamping the work thereto.

6. In an acute angle gauge for saw tables, the combination of a saw table top having a guide element carried thereon, a miter gauge, said miter gauge having a slide element and a miter blade, said miter blade being pivotally attached to said slide element, a protractor element, one end of said protractor element being attached to said miter blade, said protractor element overlapping said slide element, means on said slide element for engaging and moving said protractor element across said slide element so as to move said miter blade to any desired angle position, pointer means carried on said slide element for pointing to the readings on said protractor element to register the degree angle position of said miter blade, means on said slide element for engaging said guide element, and means carried on said slide element for locking said slide element to said guide element.

7. In an acute angle gauge for saw tables, the combination of a saw table top having a guide element carried thereon, a miter gauge, said miter gauge having a slide element and a miter blade, said miter blade being pivotally attached to said slide element, a protractor element, one end of said protractor element being attached to said miter blade, said protractor element overlapping said slide element, means on said slide element for engaging and moving said protractor element across said slide element so as to move said miter blade to any desired angle position, pointer means carried on said slide element for pointing to the readings on said protractor to register the degree angle position of said miter blade, means on said slide element for engaging said guide element, means carried on said slide element for locking said slide element to said guide element, and means on said slide element for engaging and locking said protractor segment and said miter blade in their adjusted position.

8. In an acute angle gauge for saw tables, the combination of a saw table top having a guide element carried thereon, a miter gauge, said miter gauge having a slide element and a miter blade, said miter blade being pivotally attached to said slide element, a protractor element, one end of said protractor element being attached to said miter blade, said protractor element overlapping said slide element, means on said slide element for engaging and moving said protractor element across said slide element so as to move said miter blade to any desired angle position, pointer means carried on said slide element for pointing to the readings on said protractor to register the degree angle position of said miter blade, means on said slide element for engaging said guide element, means carried on said slide element for locking said slide element to said guide element, and a clamping element carried on said miter blade for clamping work pieces thereto.

9. An angle determining attachment for a cutting machine having a work conveyor movable past a cutter, said attachment comprising a support detachably associated with the work conveyor, means for securing said support to the conveyor at various selected distances from the plane of cutting, an arm swingable relative to said support and plane about an axis located near said plane, a toothed segment gauge carried by said arm, and a worm gear on said support coacting with the teeth on said gauge for moving said arm to various positions of adjustment.

10. An angle determining attachment for a cutting machine having a work conveyor movable past a cutter, said attachment comprising a support detachably associated with the work conveyor, means for securing said support to the conveyor at various selected distances from the plane of cutting, an arm swingable relative to said support and plane about an axis located near said plane, a segment gauge having teeth thereon and carried by said arm, a worm gear on said support coacting with the teeth on said gauge for moving said arm to various positions of adjustment, and means for clamping the gauge and arm in adjusted position.

11. An angle determining attachment for a cutting machine having a work conveyor movable past a cutter, said attachment comprising, a support detachably associated with the work conveyor, means for securing said support to the conveyor at various selected distances from the plane of cutting, an arm swingable relative to said support and plane about an axis located near said plane, a segment gauge having teeth thereon and being carried by said arm, a worm gear on the support coacting with the teeth on said segment gauge for moving said arm to various positions of adjustment, and means carried by said arm for clamping the work thereto.

12. An angle determining attachment for a cutting machine, said attachment comprising a support detachably associated with the cutting machine, a blade swingable relative to said support, a segment gauge having teeth thereon, said segment gauge being carried by said blade, a worm gear, means pivotally mounting the worm gear on said support, means for normally effecting coacting engagement of the worm gear with the teeth on said segment gauge for moving said blade to various positions of adjustment, said engagement effecting means permitting release of the worm gear from the teeth of the gauge for free movement of said gauge and blade, and means on the support engageable with the segment for clamping said blade in adjusted position.

13. An angle determining attachment for a cutting machine having a work conveyor movable past a cutter, said attachment comprising a support detachably associated with the work conveyor, means for securing said support to the conveyor at various selected distances from the plane of cutting, a blade swingable relative to said support and plane about an axis located near said plane, a toothed segment gauge carried by said blade, an arm pivotally mounted on the support adjacent the toothed segment, a worm gear on said arm, and yielding means engaging the arm for normally effecting coacting engagement between the worm gear and the teeth of said gauge for moving said blade to various positions of adjustment, said yielding means allowing release of the worm gear from the teeth of the segment gauge for free movement of said gauge and blade.

WALTER E. CAMPBELL.